United States Patent [19]

Lindbom

[11] 4,442,387

[45] Apr. 10, 1984

[54] SAFE PROGRAMMING SYSTEM FOR INDUSTRIAL ROBOTS

[75] Inventor: Torsten H. Lindbom, Brookfield, Conn.

[73] Assignee: Unimation, Inc., Danbury, Conn.

[21] Appl. No.: 324,697

[22] Filed: Nov. 25, 1981

[51] Int. Cl.$^3$ ............................................. G05B 19/42
[52] U.S. Cl. ................................... 318/568; 318/440; 364/513; 91/35; 414/1
[58] Field of Search ............... 318/568, 106, 109, 440, 318/442; 364/513; 91/35-38; 414/1, 4, 5

[56] References Cited

U.S. PATENT DOCUMENTS

4,367,532  1/1983  Crum et al. ..................... 318/568 X
4,379,335  4/1983  Kirsch et al. ................... 318/568 X

FOREIGN PATENT DOCUMENTS

2064472  3/1978  United Kingdom ................ 318/568

Primary Examiner—B. Dobeck
Attorney, Agent, or Firm—Mason, Kolehmainen, Rathburn & Wyss

[57] ABSTRACT

A programmable manipulator is provided in which the manipulator arm is counter-balanced in all of its major axes and these axes are provided with low friction joints so that a relatively small force is needed to move the arm in each of its principal axes. A separate low power driving source is then used to move the arm during the teaching operation, this low power driving source being capable of developing the relatively small force needed to move the arm at low speed during the teaching operation, but being incapable of moving the arm at high speed or exerting a torque on said arm which will be potentially harmful to programming personnel. After the desired path has been taught, the manipulator apparatus is switched over to a playback mode wherein a second relatively high power source is employed to move the arm at relatively high speed during successive playback cycles.

An interlock arrangement is provided for positively preventing the high power driving source from being used to move the arm during the teaching operation so that it is impossible for malfunctions in the control system or servo valves to cause a build-up of enough momentum in the arm to be harmful to the programming operator who may be in the path of such movement.

21 Claims, 7 Drawing Figures

SAFE PROGRAMMING SYSTEM FOR INDUSTRIAL ROBOTS

The present invention relates to programmable manipulators, commonly referred to as industrial robots, and, more particularly, to programmable manipulators of the type which employ a portable teach control unit to program the manipulator during an initial teaching operation, commonly referred to as the teaching mode of the robot.

Certain of the prior art industrial robots have employed a programming or teaching operation wherein the actuators which normally move the robot arm during repetitive playback cycles are disabled and the manipulator arm is manually led through the desired path while the encoders associated with each axis of the manipulator arm develop position signals which are recorded during the teaching operation to provide command signals which may be used during the playback cycles. In certain of these arrangements which are suitable for welding, a roller is first attached to the end of the arm and this roller is manually moved along the welding groove during the teaching operation. The roller is then replaced by a welding tip during playback cycles after the desired path has been stored in memory. Typical arrangements of this type are shown in Pollard U.S. Pat. No. 2,286,571, Tuda et al. U.S. Pat. No. 4,105,937, Lindbom U.S. Pat. No. 4,115,684, Lindbom et al. U.S. Pat. No. 4,224,501 and British Pat. No. 1,418,710. In Pollard U.S. Pat. No. 2,286,571 a fluid pressure servo motor is employed to counteract the effect of the weight of the primary and secondary arms of the apparatus.

Other prior art arrangements have provided a modified manual teach arrangement in which switches associated with different axes of the arm are actuated when a handle provided on the end of the arm is stressed in a particular direction. These switches then control energization of motors which drive the arm in the corresponding axes. Such an arrangement is shown, for example, in Richter U.S. Pat. No. 4,030,617.

Still other prior art arrangements have provided a so-called joy stick control which when actuated in different directions controls the corresponding actuators of the manipulator arm to move the arm to a desired position. Such an arrangement is shown in British Pat. No. 1,337,886.

While such manual lead-through arrangements may be suitable for some applications, by far the greater number of programmable manipulators are programmed during an initial teaching operation by attaching a portable teach control unit to the console of the manipulator. This portable teach control unit is provided with plus and minus direction buttons for each axis of controlled movement. When the teach operator or programmer holds down one of these buttons, the arm is moved at a relatively slow speed, and when the arm reaches the desired position, the operator releases the button and movement in that axis stops. After the arm has been adjusted in all necessary axes to position it at a desired point, a record button, also provided on the portable teach control unit, is pressed and the position of the arm, as determined by encoders associated with each axis, is stored in memory.

After the last position has been recorded, the programming operator then transfers the manipulator to a playback mode during which the control system of the manipulator responds to the recorded signals by moving the manipulator to the desired sequence of locations established during the teaching operation. Repetitive playback cycles in this playback mode may then be repeated as often as desired until a new series of locations is taught.

In such portable teach control unit arrangements, the manipulator arm is driven during the teaching operation by the same high power driving arrangement which is employed to move the arm at relatively high speed during the playback cycles. Furthermore, since the programming operator must move the manipulator arm precisely to the desired point before it is recorded, it is necessary for the operator to be physically close to the arm so that he can observe when the end of the arm, commonly called the hand, is correctly located. However, when the programming operator is within the range of movement of the manipulator, a potentially dangerous situation exists. Considering an hydraulic actuator-servo valve arrangement which is employed in many programmable manipulators, if the servo valve malfunctions and is moved to the full open position, the arm may be moved at a speed as great as twenty feet per second in a particular axis. When it is realized that the mass of the manipulator arm is substantial, it can be readily seen that programming operator can be killed or seriously injured if he is in the path of the manipulator arm when it is moving at such a high rate of speed. Such malfunctioning of the servo valve can occur, for example, if a piece of dirt becomes lodged in the pilot section of the servo valve. Also, malfunctioning of the electronic circuitry, which normally supplies a relatively small current to the servo valve during the teaching operation so that the arm can be moved very slowly, may cause a large current to be supplied to the servo valve so that the arm will be moved very quickly under these conditions. Similar malfunctioning is possible in robots which employ electrical drive systems for the manipulator arm with the attendant possibility of serious injury to programming personnel.

It is an object, therefore, of the present invention to provide a new and improved programming arrangement for industrial robots wherein one or more of the above disadvantages of prior art arrangements is avoided.

It is another object of the present invention to provide a new and improved safe programming arrangement for industrial robots wherein a separate low power driving source is used to move the arm during the teaching operation, this low power driving source being incapable of moving the arm at high speed or exerting a torque on the arm which will be potentially harmful to programming personnel, a second high power driving source being substituted for this low power driving source to move the arm at relatively high speed during the playback cycle.

It is a further object of the present invention to provide a new and improved safe programming arrangement for industrial robots wherein a low power driving source is employed to move the arm during the teaching operation, this low power source being incapable of developing momentum in the arm which could be harmful to teaching personnel, and a second high power driving source is employed to drive the arm during the playback cycles so that the arm may be moved at high speed and carry heavy loads, and interlock means are provided for positively preventing the application of the high power driving source to the manipulator arm during the teaching operation.

Briefly considered, the present invention provides a programmable manipulator in which the manipulator arm is counter-balanced in all of its major axes and these axes are provided with low friction joints so that a relatively small force is needed to move the arm in each of its principal axes. A separate low power driving source is then used to move the arm during the teaching operation, this low power driving source being capable of developing the relatively small force needed to move the arm at low speed during the teaching operation, but being incapable of moving the arm at high speed or exerting a torque on said arm which will be potentially harmful to programming personnel. After the desired path has been taught, the manipulator apparatus is switched over to a playback wherein a second relatively high power source is employed to move the arm at relatively high speed during successive playback cycles.

An interlock arrangement is provided for positively preventing the high power driving source from being used to move the arm during the teaching operation so that it is impossible for malfunctions in the control system or servo valves to cause a buildup of enough momentum in the arm to be harmful to the programming operator who may be in the path of such movement. Preferably, the teach control means includes a portable teach control unit provided with a cable which must be connected to a cable termination unit in order to control movement of the arm during the teaching operation. The apparatus which is employed to switch the manipulator back and forth between the teach and playback modes includes a movable member which prevents said cable from being connected to said termination unit except during periods when said low power driving source is employed to move the arm, thereby positively preventing said high power driving source from moving the manipulator arm during the teaching operation.

The invention, both as to its organization and method of operation, together with further objects and advantages thereof, will best be understood by reference to the following specification taken in connection with the accompanying drawings in which.

Figure 1:
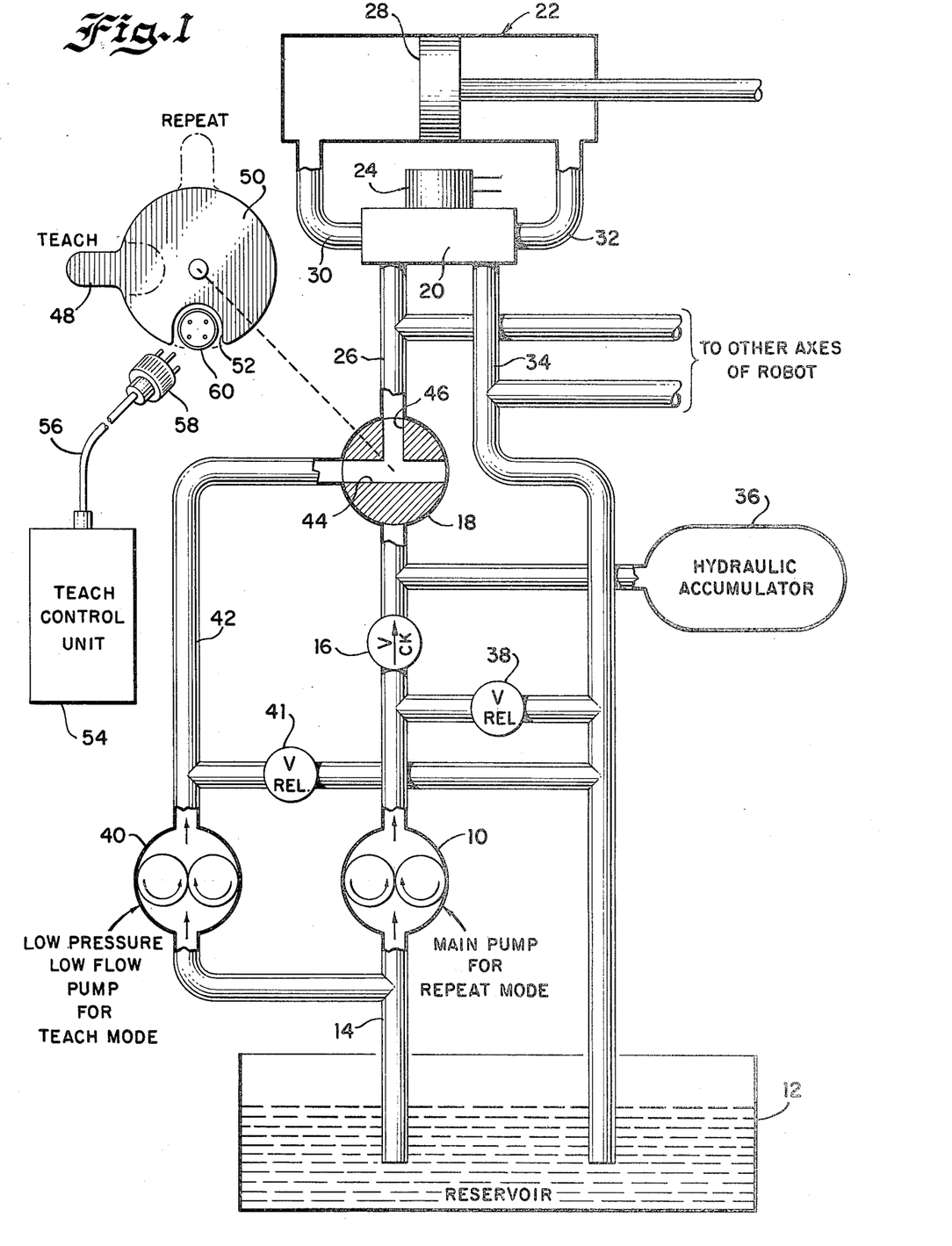
FIG. 1 is a diagrammatic illustration of an hydraulic fluid drive system for an industrial robot incorporating the features of the present invention.

Referring now to the drawings, and more particularly to FIG. 1 thereof, this figure shows an hydraulic fluid drive control arrangement for an industrial robot which incorporates the features of the present invention.

Only one controlled axis is shown in FIG. 1, it being understood that the hydraulic drive system shown therein may be employed to supply all of the other axes of the manipulator apparatus. In the arrangement of FIG. 1, a high power driving source is provided to supply the hydraulic actuator for each axis of the robot during the repetitive playback cycles in which the arm must be moved at relatively high speed. This high power driving system comprises a main pump 10, which is connected to an hydraulic fluid reservoir 12 through the inlet 14, the pump supplying hydraulic fluid at high pressure and flow rates through the check valve 16 and a three-way teach-repeat valve 18 to an hydraulic servo valve 20 which controls the hydraulic actuator 22.

The servo valve 20 includes a pilot valve 24 which is controlled by an electrical input signal and controls the main servo valve so as to supply high pressure fluid from the conduit 26 to either side of the piston 28 of the hydraulic actuator 22. Thus, if the piston 28 is to be moved to the right as viewed in FIG. 1 the servo valve 20 is moved to the position to supply high pressure fluid to the left-hand side of the piston 28 through the conduit 30. On the other hand, if the piston 28 is to be moved to the left, high pressure fluid is supplied to the conduit 32. A return conduit 34 is provided to return hydraulic fluid from either side of the piston 28 to the reservoir 12.

An hydraulic accumulator 36 is connected to the output side of the main pump 10 beyond the check valve 16, so as to assure that system pressure will be maintained when flow demands exceed the output flow capacity of the pump 10. A relief valve 38 is connected from the output side of the pump 10 to the return line 34, this relief valve acting to unload the pump 10 when its pressure reaches a maximum value, the check valve 16 being closed under these conditions so as to maintain the desired pressure in hydraulic accumulator 36. Driving power may be supplied to the other axes of the robot over the pressure line 26 and return line 34, each of these axes being provided with its own hydraulic actuator and servo valve similar to the units 22 and 20, respectively.

The high power driving system described thus far is conventionally employed in industrial robots during the teaching operation wherein a relatively low current signal is supplied to the pilot valve 24 in response to the depression of a directional button on the portable teach control unit by the teaching operator so that the manipulator arm may be moved in a particular axis at a relatively slow rate to the desired position. However, the relatively high pressure of the hydraulic driving system, and particularly the energy stored in the hydraulic accumulator 36, represents a potentially dangerous situation to teaching personnel in the event that the servo valve 20 malfunctions. If, for example, the servo valve 20 goes fully open in either direction and the main pump 10 develops a pressure of from 1,000 to 2,000 psi and hax a maximum flow rate of 50 to 100 liters per minute, the manipulator arm can very quickly assume a velocity of 20 feet per second in that particular axis, which may seriously injure the teaching operator if he is in the path of such movement.

In order to avoid such a situation, and in accordance with the present invention, a low-pressure, low-flow driving source is employed during the teaching operation and facilities are provided for positively preventing the application of the main high power driving source, including the accumulator 36, to the hydraulic actuators of the manipulator apparatus during the teaching operation. More particularly, a separate low pressure low flow pump 40 is provided to drive the actuators during the teaching mode, this pump being connected to the reservoir through the inlet 14 and providing low pressure fluid to the outlet line 42 thereof. A relief valve 41 is connected from the high pressure side of the pump 40 to the return line 34 to limit the maximum pressure attained by the pump 40 to a relatively low value.

When the three-way valve 18 is in the teach position shown in FIG. 1 it supplies this low pressure fluid through the conduits 44 and 46 of the valve 18 to the high pressure side of the servo valve 20 in each axis. The pump 40 is preferably driven by a fractional horse power motor so that the pump 40 is incapable of developing sufficient pressure in the line 42 to cause the manipulator arm to move at a velocity which will be harmful to teaching personnel, even if the servo valve 20 is fully open.

At the same time, the three-way valve 18 positively blocks the high pressure fluid developed by the main pump 10 from being supplied to the input side of each of the servo valves 20. Accordingly, when the servo valve 18 is in the teaching position shown in FIG. 1, it is impossible to develop sufficient momentum in any particular axis of the manipulator to cause injury to the teaching operator. In this connection it will be noted that no hydraulic accumulator is provided in the output side of the pump 40 so that the potential damage represented by the energy stored in such an accumulator is avoided.

In order to provide a positive interlock which insures that high pressure fluid cannot be supplied to the hydraulic actuators of the manipulator during the teaching operation, the handle 48 of the teach-repeat selector valve 18 is provided with a flange portion 50 which rotates with the handle 48 and is provided with an access notch 52 in the periphery thereof. The portable teach control unit 54 which is normally employed during the teaching operation is provided with a cable 56 terminating in the plug 58. The plug is normally arranged to be plugged into a receptacle 60, which is usually mounted on the console of the manipulator apparatus and it is only after the plug 58 has been plugged into the receptacle 60 that the manipulator apparatus can be controlled through the portable teach control unit 54. However, as shown in FIG. 1, the receptacle 60 is only accessible through the notch 52 when the selector valve 18 is in the teach position in which the receptacle 60 is not covered by the flange 50. In order for the teaching operator to place the manipulator apparatus in the repeat mode, in which high pressure fluid is supplied to the hydraulic actuators of the system it is necessary to remove the plug 58 from the receptacle so that the handle 48 may be moved to the repeat position shown in dotted lines in FIG. 1. Only after the teach control unit 54 has been disabled can the valve 18 be moved to the position in which high pressure fluid is supplied directly through the passageway 44 of the valve 18 to the pressure inlets 26 of the respective servo valves. At the same time, the low pressure outlet side of the pump 40 is blocked by the selector valve 18 when this valve is in the repeat position.

Conversely, it will be seen that when the handle 48 is in the repeat position the flange 50 covers the receptacle 60 that it is impossible for the programmer to plug in the portable teach control until until he has moved the handle 48 to the teach position and thereby insure that only low pressure fluid can be supplied to the hydraulic actuators during the teaching operation.

Preferably, the low pressure pump 40 develops a maximum pressure of only 50–100 psi, so that even if the servo valve 20 is fully opened, the piston 28 can only be moved at a velocity if 2–6 inches per second.

Figure 2:
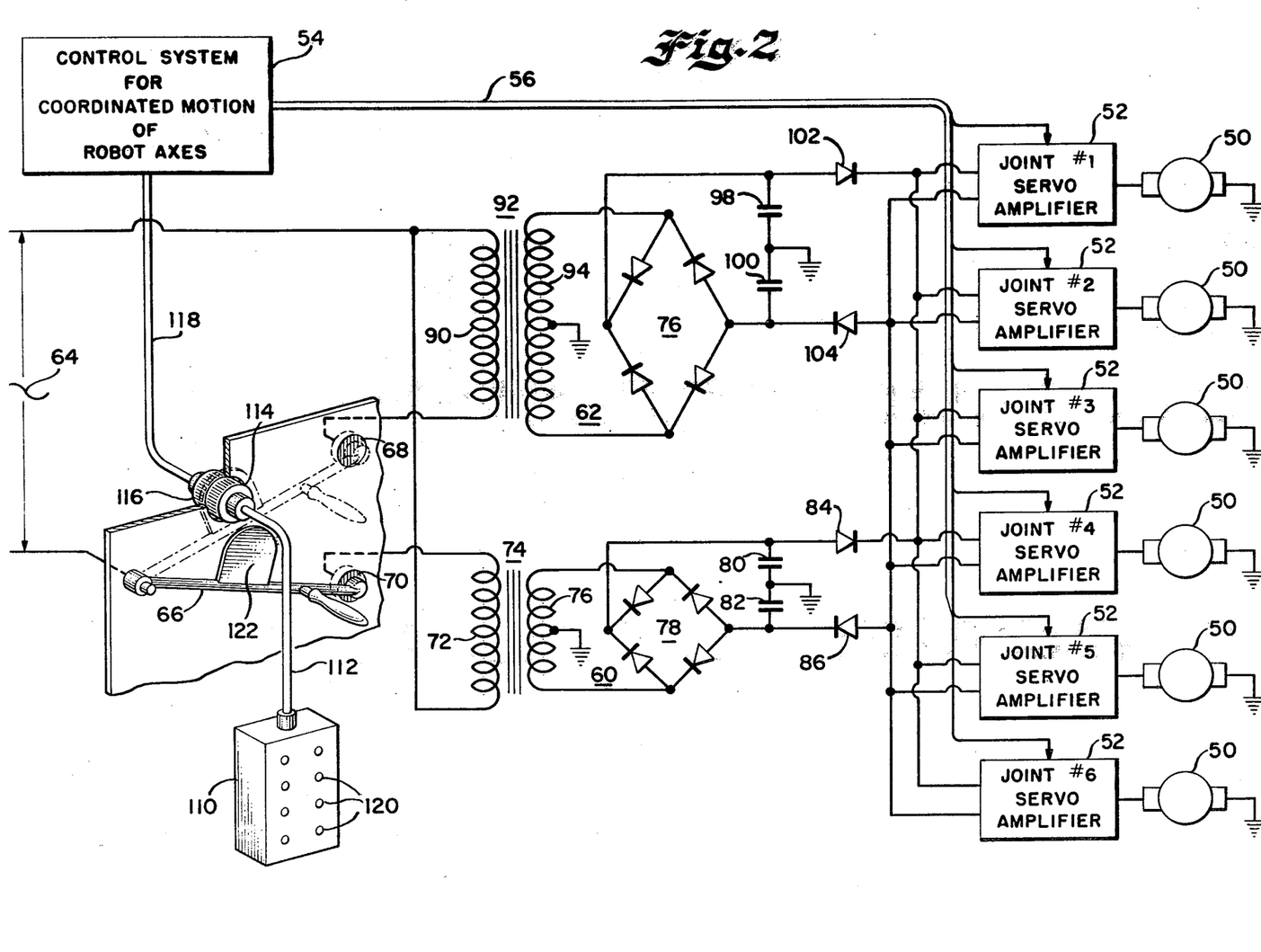
FIG. 2 is a schematic diagram of an electric drive arrangement for the various axes of an industrial robot which incorporates the features of the present invention.

In FIG. 2 an alternative arrangement of the present invention is shown for use with manipulator apparatus which employs electrical drive motors for each axis of the manipulator. Referring to this figure, the electric motors for driving each axis are shown as the motors 50, one such motor being provided for each controlled axis of the manipulator. A servo amplifier 52 is associated with each of the motors 50, this servo motor receiving command signals from the main control system 54 of the manipulator apparatus, over the cable 56.

In order to prevent the motors 50 from driving the manipulator arm at speeds which may be dangerous to personnel during the teaching operation, a low voltage and low current power supply indicated generally at 60 is provided. A separate playback power supply 62 is provided to energize the motors 50 during repetitive playback cycles.

The power supplies 60 and 62 are arranged to be selectively energized from a common AC power source 64 through a selector switching arrangement including the movable arm 66 which is movable between the fixed contacts 68 and 70. When the arm 66 is in the position shown in FIG. 2, AC power is supplied to the primary winding 72 of a relatively low voltage transformer indicated generally at 74. The voltage developed across the secondary winding 76 of the transformer 74 is rectified in the bridge rectifier 78 and filtered in the capacitors 80 and 82 so that a DC voltage of relatively low value is supplied through the isolating diodes 84 and 86 to energize the servo amplifiers 52 of each axis. The voltage developed across the secondary winding 76 is of sufficiently low value that the resultant rectified DC voltage supplied through the amplifier 52 to the motor 50 is incapable of driving that motor at a speed which will cause injury to the teaching personnel during the teaching operation.

When the teaching operation is completed, the arm 66 is moved to the contact 68 so that AC power is supplied to the primary winding 90 on the main power transformer 92. The voltage developed across the secondary winding 94 of the transformer 92 is supplied to a full wave rectifier circuit 96 so as to provide rectified DC which is filtered in the capacitors 98 and 100 and supplied through the isolating diodes 102 and 104 to the servo amplifiers 52 in place of the low voltage supply 60. The playback power supply 62 is arranged to provide sufficient power to drive the motors 50 at the required speed during playback.

For example, in a small robot the motors 50 should be capable of moving a load of five pounds at a speed of one meter/sec. In such case, the motors 50 could be d.c. permanent magnet motors. Assume that the power supply 76 develops a voltage of 32 V, and each of the three motors 50 for the three major axes of the robot draw approximately eight amperes each at a speed of 2000 rpm under the above load conditions and the three motors 50 for the three minor axes draw approximately 1½ amperes each at 2000 rpm. Assume also that the major axes motors 50 have a resistance of one ohm. The IR drop in each motor will be eight volts with each motor developing a back emf of twenty-four volts when running at 2000 rpm and under full load.

Under these conditions the teach power supply 78 could be arranged to provide a maximum speed of 100 rpm for each of the motors 50, i.e. 1/20 of the maximum speed during playback. The back emf of these motors would then be 1/20 of twenty-four volts, i.e. 1.2 volts. Assuming fifteen percent losses due to friction in the brushes and bearings, the major axes motors would require 1.2 amps each to overcome friction and the minor axes motors would require 0.225 amps each to overcome friction. Thus, a total of 4.275 amps would be required for the six motors 50 to overcome friction during the teaching mode. The voltage required from the power supply 78 for one of the major axes motors running at 100 rpm would then be 1.2 volts (for back emf) plus 1.2 volts (for resistive voltage drop) or 2.4 volts; and the power supply 78 would be designed to develop 2.4 volts at 4.275 amps above this current value and the supply 78 would fall off from 2.4 volts.

In FIG. 2 a portable teach control unit or pendant 110 is employed to control the servo amplifiers 52 and motors 50 during the teaching operation, this control unit being provided with a cable 112 having a plug 114 which is arranged to be plugged into a receptacle 116. The receptacle 116 may be mounted on the front panel of the console of the manipulator apparatus and is connected through the cable 118 to the components of the control system 54 so as to provide suitable command signals over the cable 56 to control the servo amplifiers in accordance with a particular one of the direction buttons 120 which is actuated by the teaching operator.

In order to provide a positive interlock which insures that the teaching operation cannot be performed while the playback power supply 22 is energized, the movable switch arm 66 is provided with a flag element 122 which moves with the arm 66 and covers the receptacle 116 when the arm 66 is moved to contact the fixed contact 68. Accordingly, it is impossible to insert the plug 114 into the receptacle 116 when the switch arm 66 is in a position to supply AC power from the source 64 to the playback power supply 62. It is only when the movable switch arm 66 has been moved to engage the contact 70 and thereby energize the low voltage low current teaching power supply 60 that the flag 122 is moved away from the receptacle 116 an amount sufficient to permit insertion of the teach plug 114 into the receptacle 116 and thereby enable the teach pendant 110 to control the motors 50.

In the safe programming arrangements of the present invention described heretofore, it is necessary that the manipulator arm be counter-balanced in each of its three principal axes and the rotary joints for these three principal axes should have relatively low friction so that the manipulator arm can be moved at relatively low speed by the low power driving source provided during the teaching operation. If the three principal axes of the manipulator are not counter-balanced, then a relatively large amount of power will be required to move the arm during the teaching operation. If a driving source of this power level is used to move the arm during the teaching operation then sufficient momentum can be built up that injury to the teaching personnel may result. However, it should be understood that only the three principal axes of the manipulator apparatus need be counterbalanced, since the amount of power required to drive the hand which is connected to the end of the manipulator arm and comprises the other two or three controlled axes of the manipulator is relatively small.

In this connection it should also be pointed out that the safe programming arrangement of the present invention cannot be used to program an industrial robot to perform a work operation which involves picking up or moving an object having considerable weight since such a work operation would also require considerable power from the driving source during the teaching operation. However, it will be understood that apparatus which is permanently attached to the end of the arm, such as a weld gun, or a paint spray head, can be counter-balanced so that a relatively low power driving source may be employed to move the arm during the teaching operation in accordance with the present invention.

In FIGS. 3 to 7, inclusive, a number of diagrammatic illustrations are given of various ways in which different types of manipulator arms may be counter-balanced so as to permit these manipulator arms to use the safe programming system of the present invention.

However, it will be understood that the illustrations shown in FIGS. 3 to 7, inclusive, are merely given by way of illustration and other counter-balancing arrangements may equally well be employed insofar as the present invention is concerned.

Figure 3:
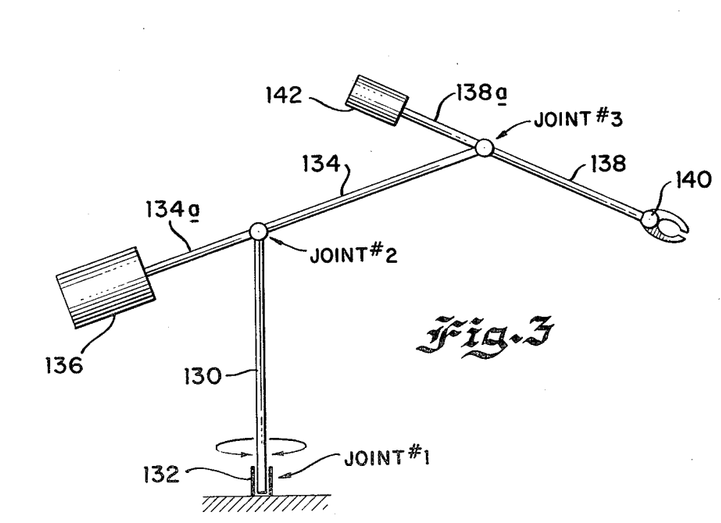
FIGS. 3, 4 and 5 are diagrammatic illustrations of counter-balancing arrangements for a revolute type of manipulator arm which may be employed in the arrangements of either FIG. 1 or FIG. 2.

Referring to FIG. 3, a diagrammatic illustration of a so-called revolute type of manipulator arm is shown wherein the three principal axes of the manipulator are counter-balanced by means of counterweights. A manipulator apparatus employing a revolute type of manipulator arm is shown, for example, in U.S. Pat. No. 4,260,941.

In FIG. 3 the Joint No. 1 is a rotary joint indicated diagrammatically at 132, which normally does not require counter-balancing.

The vertical arm portion 130 which is supported by the rotary joint 132 is then connected to the succeeding arm portion 134 by means of Joint No. 2 in which the arm portion 134 pivots about a horizontal axis. This joint may be counter-balanced by means of the counter-weight 136 which is positioned on an extension 134a of the arm 134 beyond Joint No. 2, the counterweight 136 being sufficient to counter-balance the remaining portion of the manipulator arm on the other side of Joint No. 2.

The next succeeding arm portion 138 is connected to the arm portion 136 at Joint No. 3 and this arm portion, together with the gripper or hand indicated generally at 140 which is connected to the outer end of the arm portion 138 and may include several secondary axes of motion for movement of the arm 140, is counter-balanced by means of the weight of the smaller weight 142 which is positioned on the end of the extension portion 138a of the arm 138.

It should be understood that if one of the controlled axes of the manipulator requires substantially more power to move it at relatively low speeds during the teaching operation, a separate driving source may be provided for this axis and other still lower power driving sources may be employed for the other principal axes of the manipulator which do not require as much power to drive them at a low speed. For example, if the rotary joint 132 requires more power than Joints No. 2 and No. 3 in the revolute arm shown at FIG. 3, a separate low voltage and low current power supply 60 may be provided in the electrical driving arrangement of FIG. 2 to control the motor 50 which drives the rotary axis, the power supply being capable of providing sufficient power to move the rotary axis at low speed during the teaching operation. However, a separate low-voltage, low-current power supply 60 would be provided for energizing the motor 50 which drives Joints No. 2 and No. 3, since these joints are more readily counterbalanced and will require less power to drive them at the same maximum teaching speed.

Figure 4:
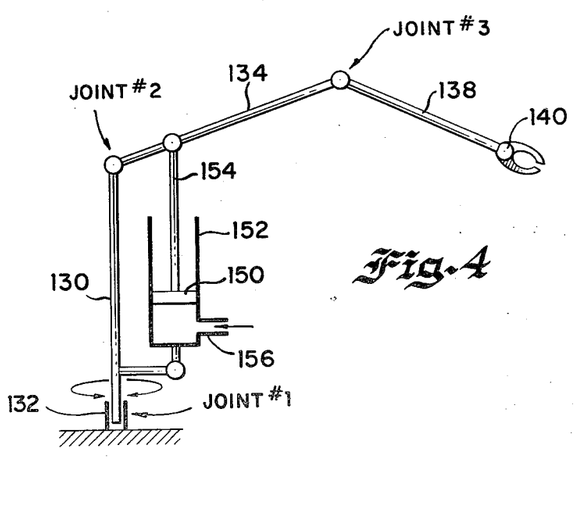
Figure 5:
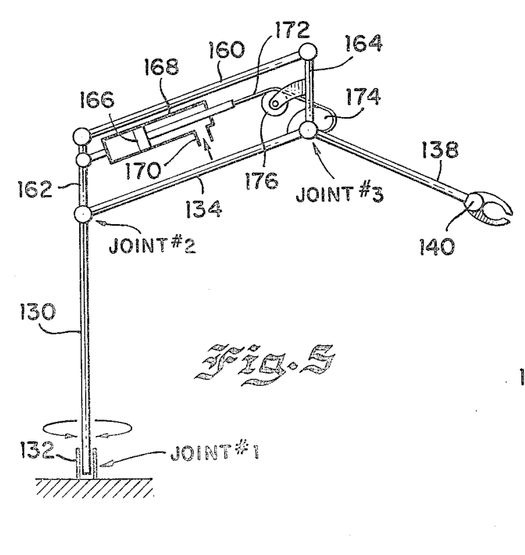

A revolute arm of the type shown in FIG. 3 may also be balanced by pneumatic or hydraulic means in the arrangements shown in FIGS. 4 and 5. Referring to FIG. 4, wherein identical elements have been given the same reference numerals, Joint No. 2 can be balanced by means of a constant pressure acting on a piston 150, which is positioned in the cylinder 152 and is connected to the element 134 through the piston rod 154, at a point intermediate Joints No. 2 and No. 3. Constant pressure from either a pneumatic or hydraulic source is supplied to the bottom side of the piston 150 through the inlet 156. Such constant pressure can be approximated by connecting the piston 150 to a large pressure vessel, such as the accumulator 36 in FIG. 1.

In FIG. 5, Joint No. 3 of the revolute arm may be balanced by a cam and parallelogram arrangement. Referring to this figure, a parallelogram is provided by means of the element 160 which is parallel to the element 134, and the shorter end elements 162 and 164. Constant pressure, which may be either pneumatic or hydraulic, is applied to the piston 166 of the actuator 168 through the inlet 170. The piston is connected through a flexible link member 172 to a cam element 174 by way of a pulley 176. The cam element 174 moves with the arm element 138 about Joint No. 3. The actuator 168 is pivotally connected to the parallelogram element 162 at a point intermediate the ends thereof. The parallelogram comprising the elements 134, 160, 162 and 164 maintains the pulley 176 in a fixed vertical and horizontal relationship to Joint No. 3.

The cam 174 replaces a simple lever to compensate for the trigonometric relationship between the balancing cylinder 168 and gravity.

Figures 6, 7:
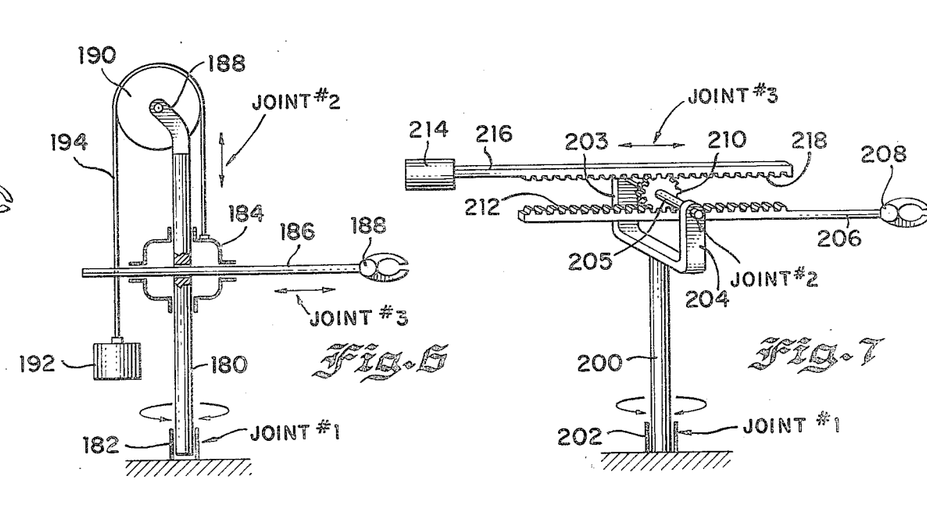
FIG. 6 is a diagrammatic illustration of a counter-balancing arrangement for a cylindrical coordinate type of manipulator arm which may be used in connection with either FIG. 1 or FIG. 2.
FIG. 7 is a counter-balancing arrangement for a polar coordinate type of manipulator arm which may be used with the arrangement of either FIG. 1 or FIG. 2.

In FIG. 6 an arrangement is shown for counterbalancing a cylindrical coordinate type of manipulator arm. Referring to this figure, the vertically extending central arm element 180 is supported at the lower end thereof by means of the rotary joint 182 and a carriage 184 is mounted for vertical movement relative to the element 180. A horizontal element 186 is slidably mounted in the carriage 184 for horizontal in and out movement of the hand 188 carried by one end of the element 186.

In order to counter-balance the carriage 184 and the elements 186 and 188 which it carries, an offset portion 188 is provided at the upper end of the element 180 which mounts a pulley 190. The carriage 184 and elements 186 and 188 are counter-balanced by means of the weight 192 which is connected to the carriage 180 by means of the flexible member 194 which extends over the pulley 90. The in-out member 186 does not require counter-balancing.

A cylindrical coordinate type of arm is shown, for example, in U.S. Pat. Nos. 3,212,649 and 3,265,946.

In FIG. 7 an arrangement is shown for counterbalancing a manipulator arm of the polar coordinate type. An arm of this type is shown for example in U.S. Pat. No. 3,661,051. Referring to FIG. 7, the vertically extending trunk element 200 is supported at its lower end at Joint No. 1 by means of the rotary joint 202. The upper end of the trunk element 200 includes the spaced arms 203 and 204 which support a cross bar 205 which constitutes the horizontal and pivotal axis of Joint No. 2. The in-out element 206 of the polar coordinate arm carries the hand 208 on the outer end thereof, the arm element 206 being moved in and out relative to the arms 203, 204 by means of a gear 210 which drives the rack 212 on the arm portion 206. The in-out motion of the arm portin 206 is designated as Joint No. 3.

In the polar coordinate type of manipulator arm shown in FIG. 7, both Joint No. 2 and Joint No. 3 may be counter-balanced by employing a counterweight 214 carried on the outer end of an arm portion 216. The arm portion 216 is driven from the gear 210 through the rack 218 provided on the arm portion 216, the arm portion 216 being positioned above the arm portion 206 and constrained to move with the arm portion 206 so that the arm portions 206 and 216 may be tilted as a unit about Joint No. 2. The counterweight 214 is moved in the opposite direction from the arm portion 206 and hand 208 and counter-balances these elements. If the counterweight 214 is equal in weight and weight distribution to the opposing arm elements the weight 214 can counter-balance both Joints No. 2 and No. 3 in FIG. 7. In this connection, is should be noted that in order to counter-balance Joint No. 2 the weights do not have to be equal but only the moments about the axis of the cross bar 205.

While there have been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator apparatus, a manipulator arm movable in a plurality of axes, memory storage means having a plurality of command signals stored therein corresponding to different positions to which said arm is to be moved during a playback cycle, means for moving said manipulator arm in each of said axes, first power driving means controlled by said stored command signals and controlling said arm moving means so that said arm is moved to said different positions during a playback cycle, counterbalancing means for said manipulator arm which is effective to reduce the force required to move said arm in each of said axes during an initial teaching mode, and second low power driving means for controlling said arm moving means during said initial programming mode, the maximum force which can be exerted on said manipulator arm by said second low power driving means during said initial teaching mode being limited to a predetermined value which is insufficient to cause injury to teaching personnel.

2. The apparatus of claim 1, wherein said arm moving means includes a separate hydraulic actuator for each of at least some of said plurality of axes, and said second low power driving means comprises a low pressure, low flow hydraulic power source arranged to supply low pressure hydraulic fluid to each of said actuators.

3. In a programmable manipulator apparatus, the combination of, a manipulator arm movable in a plurality of axes, teach control means including first low power driving means for moving said arm to different positions along a desired path during an initial teaching operation, said low power driving means having a maximum power output which is incapable of moving said arm at a teaching speed which is harmful to human beings, and playback control means including second power driving means for moving said arm to said different positions during repetitive playback cycles at a playback speed which is substantially greater than the maximum speed obtainable with said first low power driving means during said initial teaching operation.

4. The combination of claim 3, which includes interlock means for positively preventing said second power driving means from moving said arm during said initial teaching operation.

5. The combination of claim 3, which includes means for counterbalancing said manipulator arm in each of said plurality of axes so that said arm can be moved at a desired teaching speed by said first low power driving means.

6. In a programmable manipulator, the combination of, a manipulator arm, a plurality of hydraulic actuators for moving said arm in a plurality of different axes, a low pressure hydraulic power source, teach control means including said low power source for controlling said actuators to move said arm to different positions along a desired path during an initial teaching operation, the maximum power output of said low power source being incapable of driving said actuators at a teaching speed which is harmful to human beings during said teaching operation, a high pressure hydraulic power source, and means including said high power source for controlling said actuators to move said arm to said different positions during repetitive playback cycles at a playback speed which is substantially greater than the maximum speed of said arm during said initial teaching operation.

7. The combination of claim 6, which includes interlock means for positively preventing said high pressure hydraulic power source from being applied to said actuators during said initial teaching operation.

8. The combination of claim 6, wherein each of said actuators is provided with a pressure inlet line, and three-way valve means for selectively supplying said low pressure source to said inlet lines of said actuators during said initial teaching operation and said high pressure source to said inlet lines during said playback cycles.

9. The combination of claim 7, wherein said high pressure hydraulic power source includes an hydraulic accumulator and said three-way valve means positively prevents the energy stored in said accumulator from being supplied to said inlet lines during said teaching operation.

10. The combination of claim 8, wherein said teach control means includes a portable teach control unit provided with a cable having a plug on one end thereof, a receptacle for said plug, and means movable with said three-way valve means for preventing physical access to said receptacle except during periods when said valve means connects said low pressure source to said inlet lines of said actuators.

11. The combination of claim 6, wherein said low pressure hydraulic source includes a reservoir of hydraulic fluid, a first pump connected to said reservoir, and relief valve means between the outlet of said pump and said reservoir for limiting the pressure build-up at said pump outlet to a safe value during said teaching operation.

12. The combination of claim 11, wherein said pump has a sufficiently low flow at the pressure set by said relief valve to prevent a build-up in momentum of said arm during said teaching operation to a point which is dangerous to personnel.

13. The combination of claim 11, wherein said high pressure hydraulic power source includes a second pump connected to said reservoir, an hydraulic accumulator connected to said second pump for storing hydraulic fluid at high pressure, and means for supplying the output of said accumulator to said actuators only during said repetitive playback cycles.

14. In a programmable manipulator, the combination of, a manipulator arm, means including a plurality of electric motors for moving said arm in a plurality of different axes, a first electrical power supply, teach control means including said first power supply for driving said motors to move said arm to different positions along a desired path during an initial teaching operation, the maximum power output of said first power supply being insufficient to drive said arm at a teaching speed which is harmful to human beings during said teaching operation, a second electrical power supply having substantially greater maximum power output than said first power supply, and means including said second power supply for controlling said motors to move said arm to said different during repetitive playback cycles at a playback speed which is substantially greater than the maximum speed of said arm during said initial teaching operation.

15. The combination of claim 14, which includes means for positively preventing said second power supply from supplying electrical power to said motors during said initial teaching operation.

16. The combination of claim 14, wherein each of said first and second power supplies includes rectifier means for converting an AC input voltage to a DC output voltage, a common source of AC power, and means for selectively connecting AC power from said common source to said rectifier means of said first power supply during said initial teaching operation and to said rectifier means of said second power supply during said playback cycles.

17. The combination of claim 16, wherein said teach control means includes a portable teach control unit provided with a cable having a plug on one end thereof, a receptacle for said plug, said selective connecting means includes a movable member, and means movable with said member for permitting said plug to be plugged into said receptacle only during periods when said selective connecting means connects said AC power to said rectifier means of said first power supply.

18. The combination of claim 16, wherein said teach control means includes a portable teach control unit provided with a cable having a plug on one end thereof, a receptacle for said plug, said selective connecting means includes a movable member, and means movable with said member for preventing said plug from being plugged into said receptacle when said selective connecting means connects AC power to said rectifier means of said second power supply.

19. The combination of claim 14, which includes a source of power, switch means for selectively connecting said power source to either said first power supply or said second power supply, said teach control means includes a portable teach control unit provided with a cable, a stationary cable termination unit to which said cable may be connected, and means for preventing said cable from being connected to said termination unit during periods when said switch means connects said power source to said second power supply.

20. The combination of claim 14, wherein said teach control means includes manually operable switches for individually controlling different ones of said motors to move said arm along different ones of said plurality of axes during said initial teaching operation, and means for rendering said manually operable switches ineffective to control said motors except during periods when said first power supply is employed to drive said motors.

21. The combination of claim 14, which includes means for counterbalancing said arm in each of said plurality of axes so that said arm can be driven at a desired teaching speed by said first power supply.

* * * * *

UNITED STATES PATENT AND TRADEMARK OFFICE
CERTIFICATE OF CORRECTION

PATENT NO. : 4,442,387
DATED : April 10, 1984
INVENTOR(S) : Torsten H. Lindbom

It is certified that error appears in the above–identified patent and that said Letters Patent are hereby corrected as shown below:

Column 12, line 24, after "different" insert --positions--;

Title page, item [56] change "2064472" to --2006472--.

Signed and Sealed this

Twenty-fifth Day of September 1984

[SEAL]

Attest:

GERALD J. MOSSINGHOFF

Attesting Officer

Commissioner of Patents and Trademarks